2,949,434
SILICON-CONTAINING COMPOUNDS

Donald L. Bailey, Snyder, and Ronald M. Pike, Grand Island, N.Y., assignors to Union Carbide Corporation, a corporation of New York No Drawing. Filed Oct. 12, 1956, Ser. No. 615,465

30 Claims. (Cl. 260—45.2)

This invention relates to organosilicon compounds and to processes for their production. More particularly, this invention is concerned with organosilicon compounds containing, among other functional groups, the iminoalkylsilyl group [—NH(CH$_2$)$_a$Si≡] attached to a carbon atom of a triazine ring through the nitrogen atom of the imino group, as new compositions of matter. This invention is also concerned with processes for producing said organosilicon compounds and to uses thereof.

The present invention is based upon our discovery that silicon-containing triazine compounds can be produced by reacting an organosilicon compound containing the aminoalkylsilyl group [H$_2$N(CH$_2$)$_a$Si≡] wherein $a$ has a value of at least 3, with a cyanuric halide such as cyanuric chloride or cyanuric bromide to produce organosilicon triazine compounds containing the iminoalkylsilyl group as represented by the following formula:

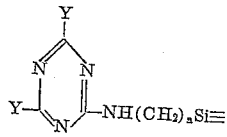

wherein $a$ is an integer having a value of at least 3, and Y represents a halogen atom such as chlorine or bromine, an amino radical, an hydroxyl radical, an alkylimino radical, an arylimino radical, an iminoalkylsilyl group.

According to our studies the reaction is a general one and is applicable to all organosilicon compounds which contain the aminoalkylsilyl group represented by the formula:

wherein $a$ is an integer of at least 3. Suitable for use in our process are the aminoalkylalkoxysilanes, the aminoalkylalkylsilanes and the aminoalkylpolysiloxanes, including copolymeric materials which contain both aminoalkylsiloxane and hydrocarbon siloxane units.

Typical of the aminoalkylalkoxysilane and aminoalkylalkylsilanes suitable for use as our organosilicon starting materials are those compounds represented by the structural formula:

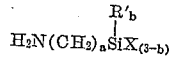

wherein R′ represents an alkyl group such as methyl, ethyl, propyl, butyl and the like, or an aryl group such as phenyl, naphthyl, tolyl and the like, or an aralkyl group such as benzyl and the like; X represents an alkoxy group such as methoxy, ethoxy, propoxy and the like; $a$ is an integer having a value of at least 3 and preferably a value of from 3 to 4; and $b$ is an integer having a value of from 0 to 3 and preferably a value of from 0 to 1. Illustrative of such compounds are gamma-aminopropyltriethoxysilane, gamma-aminopropylmethyldiethoxysilane, gamma-aminopropylethyldiethoxysilane, gamma-aminopropylphenyldiethoxysilane, gamma-aminopropyltrimethylsilane, gamma-aminopropylphenyldimethylsilane, delta-aminobutylmethyldiethoxysilane, delta-aminobutylethyldiethoxysilane, delta-aminobutylphenyldiethoxysilane, omega-aminohexyltriethylsilane, and the like.

Typical of the aminoalkylpolysiloxanes suitable for use as our organosilicon starting materials are those polysiloxanes which contain the structural unit:

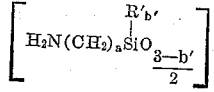

wherein R′ and $a$ have the same values described above, and $b′$ is an integer having a value of from 0 to 2. Such polysiloxanes are prepared by the hydrolysis and condensation of those aminoalkylalkoxysilanes described above or by the cohydrolysis and co-condensation of such aminoalkylalkoxysilanes with other hydrolyzable silanes and can include: aminoalkylpolysiloxanes of the trifunctional variety (i.e. where $b′=0$), aminoalkylalkyl- and aminoalkylarylpolysiloxanes of the difunctional variety which include cyclic or linear polysiloxanes (i.e. where $b′=1$) and linear aminoalkyldialkyl-, aminoalkyldiaryl- and aminoalkylalkylaryl- disiloxanes of the monofunctional variety (i.e. where $b′=2$) as well as mixtures of compounds produced by the cohydrolysis of difunctional and trifunctional aminoalkylsilanes.

Suitable starting aminoalkylpolysiloxanes of the trifunctional variety can be more specifically depicted as containing the structural unit:

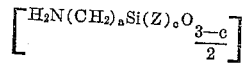

wherein $a$ has the value previously described, Z represents an hydroxyl or alkoxy group and $c$ has an average value of from 0 to 1, and can be as high as 2; preferably $c$ has a value from 0.1 to 1. Aminoalkylpolysiloxanes of this variety which are essentially free of silicon-bonded alkoxy or hydroxyl groups (i.e. where $c=0$) can be prepared by the complete hydrolysis and the complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzates so formed to produce the desired polymer.

Suitable starting aminoalkylpolysiloxanes of the difunctional variety, which include cyclic and linear polysiloxanes, can be more specifically defined by the structural formula:

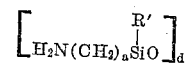

wherein R′ and $a$ have the values previously described and $d$ is an integer having a value of at least 3 and can be as high as 7 for the cyclic aminoalkylsiloxanes and higher for the linear aminoalkylpolysiloxanes. Such cyclic and linear aminoalkylpolysiloxanes can be prepared by the hydrolysis and condensation of aminoalkylalkyl- or aminoalkylaryldiethoxysilanes. In carrying out the hydrolysis and condensation procedures, there is produced a product comprising a mixture of cyclic and linear polysiloxanes from which the desired polysiloxane can be recovered. Illustrative of the cyclic aminoalkylsiloxanes suitable for use as the organosilicon starting material in our process are the cyclic tetramer of gamma-aminopropylmethylsiloxane, the cyclic tetramer of delta-aminobutylphenylsiloxane and the like. Illustrative of suitable linear aminoalkylpolysiloxanes are gamma-aminopropylmethylpolysiloxane, gamma-aminopropylethylpolysiloxane, delta-aminobutylmethylpolysiloxane and the like.

Included among the useful starting linear aminoalkylpolysiloxanes are the alkyl, alkoxy and hydroxyl end-blocked polysiloxanes which contain from 1 to 3 of such groups bonded to the terminal silicon atoms of the molecules comprising the polymeric chains. Thus we can also employ as our starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monothoxydimethylsilyl end-blocked gamma-aminopropylphenylpolysiloxane and the like. The end-blocked linear aminoalkylalkyl- and aminoalkylarylpolysiloxanes useful in our process can be prepared by the equilibration of cyclic aminoalkylsiloxanes with silicon compounds containing predominantly silicon-bonded alkoxy groups, or by the co-hydrolysis and condensation of trialkylalkoxysilanes with aminoalkylalkyl- or aminoalkylaryldiethoxysilanes. Hydroxy end-blocked linear polysiloxanes can be prepared by heating linear or cyclic aminoalkylpolysiloxanes with water.

The copolymeric aminoalkylpolysiloxanes which can be employed as starting materials can be depicted as containing both of the structural units:

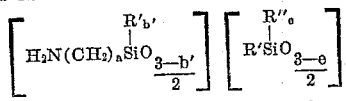

wherein R', a and b' have the values described above R" represents an alkyl or aryl group and e is an integer having a value of from 0 to 2. Our copolymers can be mixtures of trifunctional aminoalkylsiloxanes units (where b'=0) with trifunctional alkyl-, aryl- or mixed alkyl- and arylsiloxane units (where e=0) or with difunctional alkyl, aryl- or mixed alkyl- and arylsiloxanes units (where e=1). They can also include mixtures of difunctional aminoalkylsiloxane units (where b'=1) with trifunctional alkyl-, aryl- or mixed alkyl- and arylsiloxane units (where e=0) or with difunctional alkyl-, aryl or mixed alkyl- and arylsiloxane units (where e=1).

Those copolymers which contain trifunctional aminoalkylsiloxane units and other siloxane units are preferably prepared by the co-hydrolysis and co-condensation of the corresponding alkoxysilane starting materials. Such copolymers can contain silicon-bonded hydroxyl or alkoxy groups or they can comprise essentially completely condensed materials. The linear copolymeric siloxanes are preferably prepared by the separate hydrolysis and condensation of an aminoalkylalkyl- or aminoalkylaryldialkoxysilane and the dialkyl- or diaryldialkoxysilane to cyclic aminoalkylsiloxanes and cyclic dialkyl- or diarylsiloxanes and subsequently equilibrating mixtures of such cyclic siloxanes to linear copolymers. Such linear co-cyclic polymers can also contain chain-terminating or end-blocking groups such as alkyl, alkoxy or hydroxyl groups. The equilibration will also produce some copolymeric cyclic siloxanes.

The aminoalkylalkoxysilanes and aminoalkylpolysiloxanes as well as copolymers containing aminoalkylsiloxanes and hydrocarbon siloxane units are all disclosed and claimed as new compositions of matter in copending U.S. applications Ser. Nos. 615,466, 615,481, 615,483 and 615,507, filed concurrently herewith. Processes for producing such compounds are also disclosed and claimed in said copending applications.

The overall reaction of cyanuric halides with our starting aminoalkyl silicon compounds to produce completely substituted compounds is a stepwise reaction. In most instances the first halogen atom of the cyanuric halide is replaced by an aminoalkyl silicon compound at a temperature of about 0° C.; the second halogen atom is replaced at about 30° C. to about 60° C.; and the third chlorine atom is replaced at about 90° C. or above. Thus three moles of amino compounds can be reacted with one mole of cyanuric halide. It is known that the basic character of the amino group in aromatic amines is weakened by the presence of negative groups, such as sulfo groups, and that such negative-group substituted amino compounds will not replace the third halogen atom. Therefore, compounds such as sulfanilic acid and 1-amino-8-hydroxynaphthalene-3,6-disulfonic acid generally react with the first or second halogen atom of the cyanuric halide and not with the third halogen atom.

In the reaction between cyanuric halide and an amine there is liberated one mole of hydrohalic acid for each mole of halogen reacted. The reaction proceeds at a faster rate when the hydrohalic acid formed is removed from the reaction zone by the addition of an acid acceptor to the reaction mixture. Suitable acid acceptors are the organic amines such as pyridine, triethylamine, and the like which do not contain active hydrogen atoms on the nitrogen atom; and the inorganic bases such as sodium carbonate, sodium bicarbonate, sodium hydroxide, and the like. We prefer to use a molar equivalent of acid acceptor per mole of halogen being reacted; however, larger or smaller amounts may also be used.

The silicon-containing triazine compounds of this invention are produced by reacting at least one mole of an aminoalkyl silicon compound with at least one of the halogen atoms attached to the cyanuric halide. The other two halogen atoms on the cyanuric acid can also be reacted with aminoalkyl silicon compounds, or they can be left attached to the triazine ring. In addition, one or both of these two remaining halogen atoms may be reacted with water, ammonia or organic primary amines. When water is used as one of the reactants to replace a halogen atom and the aminoalkyl silicon compound contains functional alkoxy groups, there will occur some hydrolysis and the product will be a siloxane. Thus it is possible, by the process of this invention to produce silicon-containing triazine compounds containing one, two or three iminoalkylsilyl [—NH(CH₂)ₐSi≡] groups attached to the triazine ring. For example, when cyanuric chloride is reacted with gamma-aminopropyltriethoxysilane one can obtain three different products by varying the amount of silane and the reaction temperatures. These products are: the primary condensation product (I) 2,4-dichloro-6-(gamma-triethoxysilylpropylimino)-triazine, the secondary condensation product (II) 2-chloro-4,6-di-(gamma-triethoxysilylpropylimino)-triazine, and the tertiary condensation product (III) 2,4,6-tri-(gamma-triethoxysilylpropylimino)-triazine. The chlorine-containing triazine primary and secondary condensation products (I and II) can in turn be reacted with water, ammonia or primary amines to produce compounds such as: 2,4-diamino-6-(gamma-triethoxysilylpropylimino)-triazine, 2-amino-4,6-di-(gamma-triethoxysilylpropylimino)-triazine, 2-anilino-4,6-di-(gamma-triethoxypropylimino)-triazine, 2-(4'-sulfoanilino)-4,6-di-silylpropylimino)-triazine, 2-hydroxy-(gamma-triethoxysilylpropylimino)-triazine, 2-hydroxy-4,6-di-(gamma-triethoxysilylpropylimino)-triazine, and the like.

Among the amines suitable for use in the process of our invention are: the aryl amines such as aniline, the aminophenols, benzylamine, p-ethoxyaniline, the naphthylamines such as, for example, 2-naphthylamine and 1-amino-8-hydroxynaphthalene-3,6-disulfonic acid, p-chloroaniline, sulfanilic acid, and the like; the alkyl amines such as methylamine, butylamine, di-n-butylamine, allylamine, cyanomethylamine, 3-hydroxypropylamine, and the like; and the inorganic amines such as anhydrous ammonia or ammonium hydroxide.

In the process of our invention we prefer to conduct the reaction in the presence of a liquid solvent. When the aminoalkyl silicon compound selected for the reaction with the cyanuric halide is a functional silane, or a polysiloxane, we prefer to conduct the reaction in the presence of an inert gas and in an inert liquid organic solvent in order to prevent oxidation and hydrolysis of the functional silane during the reaction and to serve as a diluent for the polysiloxane. Among the liquid organic compounds suitable are diethyl ether, toluene, benzene, acetone, ethanol, carbon tetrachloride, and the like.

The monomeric organosilicon triazine compounds of this invention may be represented by the following formula:

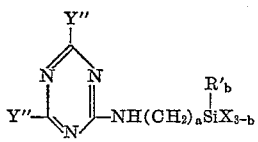

wherein R', X, $a$ and $b$ have the same meanings as hereinbefore indicated; and Y" represents a halogen atom, amino radical, hydroxyl radical, alkylimino radical, arylimino radical, or an

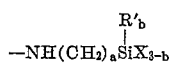

radical.

The polymeric silicon-containing triazine compounds produced by the processes of this invention are the siloxane polymers containing units represented by the formula:

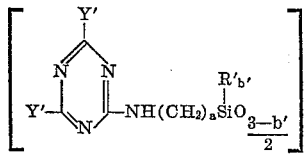

and siloxane copolymers containing units represented by the following formulae:

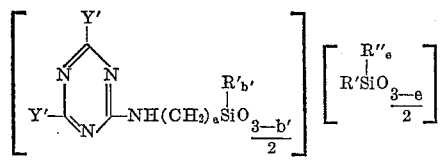

wherein R', R", $a$, $b'$ and $e$ have the same meanings as hereinbefore indicated; and Y' represents a halogen atom, amino radical, hydroxyl radical, alkylimino radical, arylimino radical, or

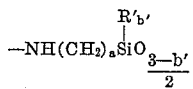

radical; and wherein the polymeric siloxane compounds may contain alkoxy or hydroxyl groups bonded to some of the silicon atoms.

The novel monomeric and polymeric compounds of this invention are useful, for example as sizes for fibrous materials, water repellants, modifiers for other siloxane polymers, coatings, grease-modifiers, molding compositions, as intermediates in producing modified melamine-type resins, or as plasticizers.

In producing modified melamine-type resins, silicon-containing triazine compounds of this invention containing one or two amino groups attached to the triazine ring, preferably two amino groups, as represented by the formula:

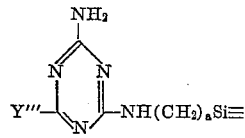

wherein $a$ is an integer having a value of at least 3 and Y''' represents an amino radical or an iminoalkylsilyl radical, may be reacted with formaldehyde or formaldehyde-producing compounds. We can also produce modified melamine-type resins by compounding the silicon-containing triazine compounds of this invention with conventional heat-curable melamine resins. The compositions so obtained can then be heat-cured to produce infusible and insoluble resins.

The following examples further serve to illustrate the invention. All parts are by weight unless otherwise indicated.

*Example 1*

A 250 ml. three-necked Pyrex flask was equipped with a stirrer, dropping funnel, condenser and thermometer. Added 100 ml. of anhydrous diethyl ether and 28.4 g. of cyanuric chloride to the flask and the mixture was stirred and cooled to 0° C. by immersing the flask in an ice bath. At 0° C. added to the solution in the flask, in a dropwise manner over a ½-hour period, a solution containing 22.1 g. of gamma-aminopropyltriethoxysilane and 10.1 g. of triethylamine in 50 ml. of anhydrous diethyl ether, the mixture was then stirred for an additional ½ hour. Triethylamine hydrochloride precipitated out during the reaction and was filtered off under a protective nitrogen atmosphere and the ether was distilled from the filtrate at room temperature under reduced pressure. The residue was fractionally distilled and there was obtained 10 g. of 2,4-dichloro-6-(3-triethoxysilylpropylimino)-triazine boiling at 175° to 185° C. at 0.6 mm. of mercury. Microanalysis: Calculated for $C_{12}H_{22}O_3N_4Cl_2Si$: Cl, 19.3. Found: Cl, 19.6.

*Example 2*

A mixture of 50 g. of 2,4-dichloro-6-(3-triethoxysilylpropylimino)-triazine and 500 ml. of absolute ethanol, which had been saturated with anhydrous ammonia at about 0° C., was placed in a 3-liter stainless steel autoclave. The autoclave was sealed and rocked at about 130° C. for 10 hours. After cooling to room temperature the reaction mixture was removed from the autoclave with the aid of about 100 ml. of absolute ethanol. The combined fractions were distilled at room temperature under reduced pressure to remove the ethanol, and the residue was then extracted with a total volume of 100 ml. of dry chloroform. The chloroform was distilled off at reduced pressure and the yield of 2,4-diamino-6-(3-triethoxysilylpropylimino)- triazine was 37.5 g. Microanalysis: Calculated for $C_{12}H_{26}O_3N_6Si$: N, 25.4. Found: N, 24.6.

*Example 3*

A 500 ml. three-necked flask was equipped as described in Example 1; a solution of 100 ml. of toluene and 9.3 g. of cyanuric chloride was placed therein and the solution cooled in an ice bath to 0° C. A mixture of 11.1 g. of gamma-aminopropyltriethoxysilane and 5.1 g. of triethylamine was added to the flask at 0° C. Stirred the reaction mixture for another 15 minutes at 0° C. and then warmed to room temperature. A second portion of 11.1 g. of gamma-aminopropyltriethoxysilane and 5.1 g. of triethylamine was added over a 20 minute period; during the addition the temperature rose to 50° C. The reaction mixture was stirred at about 50° C. for an additional hour to produce the secondary condensation product and then heated to about 110° C. so as to maintain a reflux. A third portion of 11.1 g. of gamma-aminopropyltriethoxysilane and 5.1 g. of triethylamine was added over a 15 minute period at 110° C. and the mixture stirred at reflux for about 16 hours. The reaction mixture was cooled and the precipitated triethylamine hydrochloride was filtered off. Solvent and unreacted starting materials were distilled off by heating under reduced pressure. The residual 2,4,6-tri-(3-triethoxysilylpropylimino)-triazine was a light brown viscous oil weighing 27.5 g. Microanalysis: Calculated for $C_{30}H_{66}O_9N_6Si_3$: N, 11.4. Found: N, 11.4.

Example 4

Added 100 ml. of toluene and 8 g. of 2-amino-4,6-dichloro-triazine to a 500 ml. three necked flask equipped as described in Example 1 and stirred the mixture until a clear solution was obtained. A mixture of 10.7 g. of gamma-aminopropyltriethoxysilane and 4.9 g. of triethylamine was added to the reaction flask over a 15 minute period. During the addition the reaction temperature rose to 60° C. The mixture was stirred for an additional hour at about 60° C. and the temperature was then raised to 140° C. A second portion of a mixture of 10.7 g. of gamma-aminopropyltriethoxysilane and 4.9 g. of triethylamine was added and the reaction mixture was stirred at 140° C. for 16 hours. Cooled to room temperature and filtered off the precipitated triethylamine hydrochloride. The solvents were distilled off at about 25° C. under a reduced pressure of about 2 mm. of mercury. The residual 2-amino-4,6-di-(3-triethoxysilylpropylimino)-triazine was a light brown viscous oil weighing 24 g. Microanalysis: Calculated for $C_{21}H_{46}O_6N_6Si_2$: N, 15.8: $OC_2H_5$, 50.6. Found: N, 16.6: $OC_2H_5$, 50.8.

Example 5

While slowly stirring, gradually added 40 ml. of water to 8.7 g. of 2,4,6-tri-(3-triethoxysilylpropylimino)-triazine contained in a 125 ml. beaker. A pale brown oil-like product suspended in water was obtained. The mixture was transferred to a 250 ml. three-necked flask with the aid of 60 ml. of water and stirred for 24 hours at the reflux temperature, about 100° C. During this period 5 ml. of distillate consisting of an azeotropic mixture of water and ethanol was removed and the reaction mixture changed and became a slurry of a solid product suspended in water. The solid resin was filtered off and dried at room temperature in a desiccator for 24 hours. The dried material weighed 3.6 g. The resinous product contains units which may be represented by the following formula:

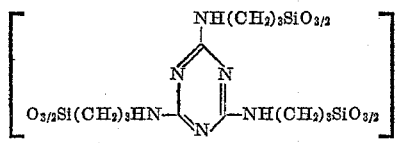

Example 6

A one lier three-necked flask was equipped with two dropping funnels, a stirrer and a thermometer, and charged with 50 ml. of water cooled to 0° to 5° C. A solution of 9.3 g. of cyanuric chloride dissolved in about 25 ml. of acetone was added to the cold water and the cyanuric chloride formed finely divided crystals suspended in water. A solution of 8.65 g. of sulfanilic acid in 30 ml. of water which had been neutralized to a pH of about 7 was added to the cyanuric chloride slurry at 0° to 5° C. Simultaneously a solution of 5.3 g. of sodium carbonate in 45 ml. of water was added at such a rate that the reaction mixture was maintained at a pH negative to Congo Red paper throughout the addition of the sulfanilic acid. The solution in the flask was stirred for an additional hour at 0° to 5° C. and then warmed to 30° C. A second portion of the same quantities of sulfanilic acid and sodium carbonate dissolved in water was added at 30° C. to 35° C. to produce the secondary condensation product 2-chloro-4,6-di-(p-sulfophenylimino)-triazine and the mixture was stirred at about 30° C. for 1.5 hours after the addition was completed. During this stirring period the reaction was maintained at a pH negative to Congo Red paper by the addition of small amounts of sodium carbonate solution as needed. A solution of gamma-aminopropylpolysiloxane was prepared by dissolving 10.5 g. of gamma-aminopropyltriethoxysilane in 25 ml. of water at about 50° C. This solution was added to the solution of 2-chloro-4,6-di-(p-sulfophenylimino)-triazine produced above and the entire reaction mixture was stirred and heated at the reflux temperature (about 100° C.) for 16 hours. During this period 20 ml. of a 10% by weight aqueous sodium carbonate solution was added to maintain the pH of the reaction negative to Congo Red paper. The solution was then cooled and acidified to a pH of 5-6 with dilute hydrochloric acid and the resulting precipitate was filtered off and washed on the funnel with ethanol. The white powder of 2,4-di-(p-sulfophenylimino)-6-(3-siloxypropylimino)-triazine was dried overnight at room temperature on a clay plate and then in a vacuum oven at 65° C. for 12 hours. Microanalysis: Calculated for $C_{18}H_{19}O_{7.5}N_6S_2Si$: N, 14.2; S, 10.8. Found: N, 14.4; S, 9.9. The siloxane produced contains units which may be represented by the following formula:

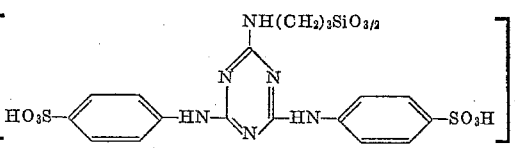

Example 7

A solution of 3.68 g. of cyanuric chloride in 150 ml. of anhydrous ether was prepared in a 500 ml. 3-necked Pyrex flask equipped with a stirrer, thermometer, dropping funnel and a condenser surmounted by a calcium chloride drying tube. In a dropwise manner over a period of about ½ hour added a mixture consisting of 2 g. of triethylamine and 20 g. of a trimethylsiloxy end blocked aminosiloxane oil, having an average molecular weight of about 1000 and containing about 10 weight percent gamma-aminopropylmethylsiloxy units, which can be represented by the formula:

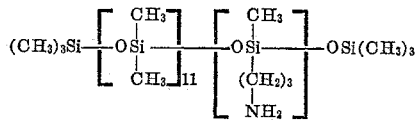

in 50 ml. of anhydrous ether at 0–5° C. A white precipitate of triethylamine hydrochloride appeared immediately. The reaction mixture was stirred at about 0° C. for about 3 hours after the addition was completed and then filtered to remove the white precipitate. The ether was distilled off at room temperature under reduced pressure and the residual viscous oil was again filtered to remove a small amount of finely divided white precipitate. The dichlorotriazine silicone oil produced weighed 18.6 g., and may be represented by the formula:

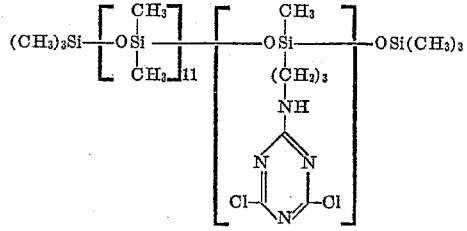

Microanalysis: Calculated for $C_{35}H_{94}O_{13}Cl_2N_4Si_{14}$: N, 4.85; Cl, 6.1. Found: N, 5.0; Cl, 6.0.

Example 8

A 300 ml. stainless steel autoclave was charged with 18 g. of the dichlorotriazine siloxane oil produced in Example 7 and 100 ml. of absolute ethanol which had previously been saturated with ammonia by bubbling anhydrous ammonia through the ethanol at about 0° C. The autoclave was sealed and rocked and heated at 130° C. for about 10 hours. After cooling the autoclave to about room temperature the contents were removed and the autoclave was rinsed with 50 ml. of ethanol. A white precipitate was filtered off and the ethanol was then distilled off at room temperature under reduced pressure. The resulting oil was again filtered to remove a small amount of finely divided white precipitate. The crude diaminotriazine silicone oil weighed 14.1 g. and can be represented by the formula:

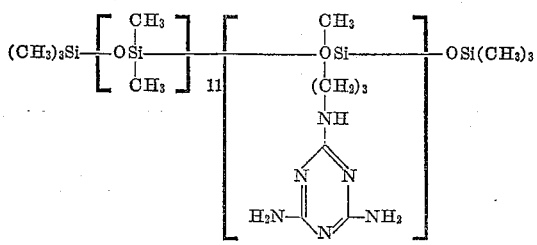

Example 9

A glass slide was coated with the diaminotriazine siloxane oil of Example 8. The coated slide was wiped dry with paper tissue and the thin film remaining on the glass was baked at 130° C. for about 3 hours. The treated slide exhibited excellent water-repellant properties. Water droplets placed on the treated slide had a high contact angle and no trace of water remained when the water droplet was shaken from the glass. Whereas, an untreated slide treated with water droplets in the same manner showed lower contact angles, and residual traces of water when the slide was shaken.

Example 10

A mixture of 1 g. of 2,4-diamino-6-(3-triethoxysilyl-propylimino)-triazine and 5 g. of a commercial melamine-formaldehyde resin ("Melmac 405," a melamine resin sold by American Cyanamid Co.) was prepared in a small beaker. The mixture was heated and stirred at about 150° C. for about 10 minutes until a sticky resin-like product formed. The product was heat cured in an oven at 120° C. for ½ hour to an infusible, insoluble and brittle polymer, which did not melt or fuse, but only charred, in a flame. The starting melamine-formaldehyde resin melts and fuses when held in a flame.

Example 11

A 1:1 ethanol-water solution containing 1.2 parts of the indicated silicon-containing triazine compound, per 100 parts of solution, was prepared. Glass cloth was dipped in this solution and air dried at 25° C. The sized cloth was then impregnated with 50% by weight aqueous solution (95 parts butanol, 5 parts water) of the same melamine formaldehyde resin used in Example 10. The impregnated strips were pre-cured at 125° C. for about 5 minutes and then given a final heat-curing at 150° C. for 10 minutes. The cured strips were tested for flex strength (ASTM D650–42T) and retention. For comparison the same tests were carried out on unsized glass cloth samples. The results are listed below:

| Source of Silicon-Containing Triazine | Flex Strength, p.s.i. | | Retention |
|---|---|---|---|
| | Wet | Dry | |
| Ex. 2 [1] | 59,000 | 61,000 | 104 |
| Ex. 2 | 69,000 | 68,000 | 97.5 |
| Ex. 3 | 50,400 | 56,700 | 112 |
| Ex. 4 | 71,000 | 64,800 | 91.5 |
| Unsized cloth | 30,000 | 15,000 | 50 |

[1] Precured for only 2 minutes at 125° C.

What is claimed is:
1. Silicon-containing triazine compounds selected from the group consisting of silanes represented by the formula:

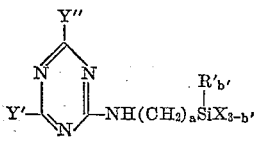

and siloxane polymers and copolymers containing the structural unit represented by the formula:

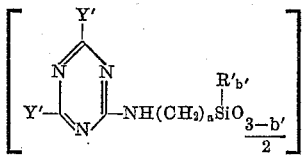

wherein R' represents a member selected from the group consisting of alkyl radicals, aryl radicals and aralkyl radicals; $a$ is an integer having a value of at least 3, wherein the $(CH_2)_a$ group is a lower alkylene group; X represents a member selected from the group consisting of lower alkoxy radicals; $b$ is an integer having a value of from 0 to 3; $b'$ is an integer having a value of from 0 to 2; Y" represents a member selected from the group consisting of halogen atoms, the amino radical, hydroxyl radicals, arylamino radicals, alkylamino radicals and

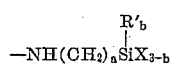

radicals; and Y' represents a member selected from the group consisting of halogen atoms, amino radicals, hydroxyl radicals, arylamino radicals, alkylamino radicals and

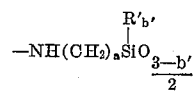

radicals.

2. Silicon containing triazine compounds selected from the group consisting of silanes represented by the formula:

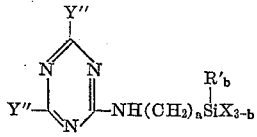

wherein R' represents a member selected from the group consisting of alkyl radicals, aryl radicals and aralkyl radicals; X represents a member selected from the group consisting of lower alkoxy radicals; $a$ is an integer having a value of at least 3, wherein the $(CH_2)_a$ group is a lower alkylene group; $b$ is an integer having a value of from 0 to 3; and Y" represents a member selected from the group consisting of halogen atoms, the amino radical, hydroxyl radicals, arylamino radicals, alkylamino radicals and

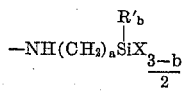

radicals.

3. Silicon-containing triazine compounds selected from the group consisting of siloxane polymers consisting of units represented by the formula:

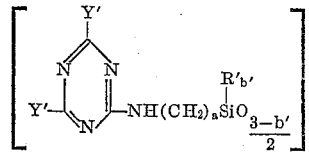

and siloxane copolymers consisting of units represented by the formulae:

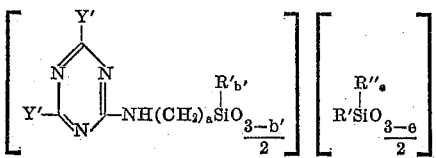

wherein R' represents a member selected from the group consisting of alkyl radicals, aryl radicals and aralkyl radicals; $a$ is an integer having a value of at least 3, wherein the $(CH_2)_a$ group is a lower alkylene group; $e$ and $b'$ are integers having a value of from 0 to 2; and Y' represents a member selected from the group consisting of halogen atoms, amino radicals, hydroxyl radicals, arylamino radicals, alkylamino radicals and

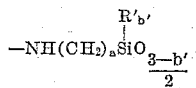

radicals.

4. 2,4-dichloro-6-(3-triethoxysilylpropylimino)-triazine.
5. 2,4-diamino-6-(3-triethoxysilylpropylimino)-triazine.
6. 2,4,6-tri-(triethoxysilylpropylimino)-triazine.
7. Polysiloxanes containing units represented by the formula:

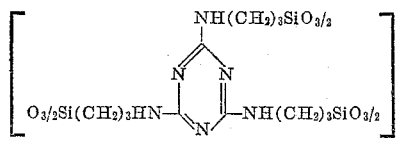

8. Polysiloxanes containing units represented by the formula:

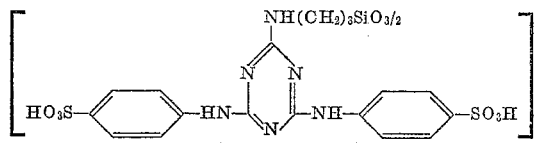

9.

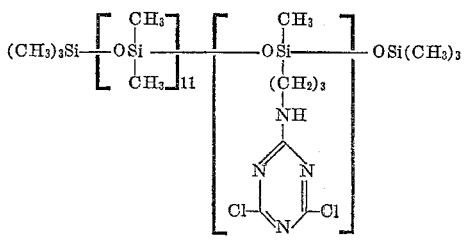

10.

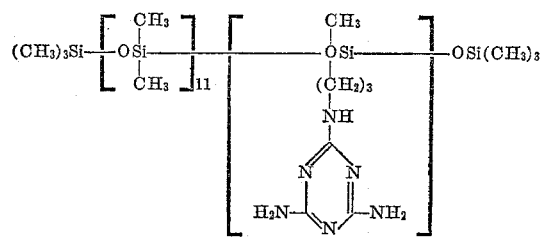

11. A heat-curable resinous composition comprising a mixture of (1) a melamine-formaldehyde resin and (2) a silicon-containing triazine compound selected from the group consisting of siloxane polymers and copolymers containing the structural unit represented by the formula:

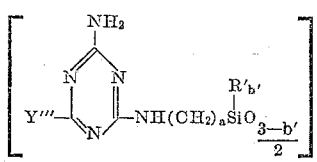

wherein R' represents a member selected from the group consisting of alkyl radicals, aryl radicals and aralkyl radicals; $a$ is an integer having a value of at least 3, wherein the $(CH_2)_a$ group is a lower alkylene group; $b'$ is an integer having a value of from 0 to 2; and Y''' represents a member selected from the group consisting of an amino radical and an aminoalkylsilyl radical represented by the general formula

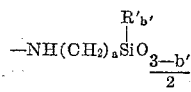

12. A heat-curable resinous composition comprising a mixture of (1) a melamine-formaldehyde resin and (2) a silicon-containing triazine compound selected from the group consisting of silanes represented by the formula:

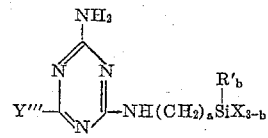

wherein R' represents a member selected from the group consisting of alkyl radicals, aryl radicals and aralkyl radicals; $a$ is an integer having a value of at least 3, wherein the $(CH_2)_a$ group is a lower alkylene group; X represents a member selected from the group consisting of lower alkoxy radicals; $b$ is an integer having a value of from 0 to 3; and Y''' represents a member selected from the group consisting of an amino radical and an aminoalkylsilyl radical represented by the general formula

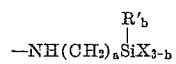

13. A heat-curable resinous composition comprising a mixture of (1) a melamine-formaldehyde resin, and (2) the silicon-containing triazine compound represented by the formula:

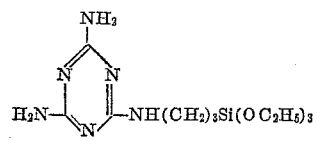

14. A novel composition comprising a fibrous material and a coating thereon of silicon-containing triazine compounds selected from the group consisting of silanes represented by the formula:

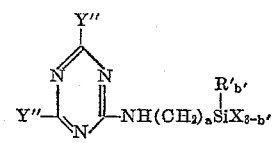

and siloxane polymers and copolymers containing the structural unit represented by the formula:

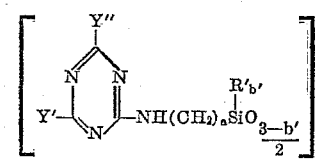

wherein R' represents a member selected from the group consisting of alkyl radicals, aryl radicals and aralkyl radicals; $a$ is an integer having a value of at least 3, wherein the $(CH_2)_a$ group is a lower alkylene group; X represents a member selected from the group consisting of lower alkoxy radicals; $b$ is an integer having a value of from 0 to 3; $b'$ is an integer having a value of from 0 to 2; Y'' represents a member selected from the group consisting of halogen atoms, the amino radical, hydroxyl radicals, arylamino radicals, alkylamino radicals and

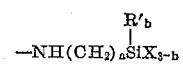

radicals; and Y' represents a member selected from the group consisting of halogen atoms, amino radicals, hydroxyl radicals, arylamino radicals, alkylamino radicals and

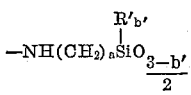

radicals.

15. Process for the production of silicon-containing triazine compounds, which comprises admixing an aminoalkylsilicon compound selected from the group consisting of silanes represented by the general formula:

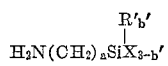

and siloxanes containing the structural unit represented by the general formula

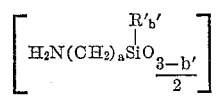

wherein $R'$ represents a member selected from the group consisting of alkyl radicals, aryl radicals and aralkyl radicals; $X$ represents a lower alkoxy radical; $a$ is an integer having a value of at least 3 whereby the $(CH_2)_a$ group is a lower alkylene group; $b'$ is an integer having a value of 0 to 2; and $b$ is an integer having a value of from 0 to 3, with a cyanuric halide within the range of from about 0° C. to the reflux temperature of the reaction mass.

16. Process for the production of silicon-containing triazine compounds which comprises admixing an aminoalkylsilicon compound selected from the group consisting of silanes represented by the general formula:

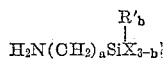

and siloxanes containing the structural unit represented by the general formula:

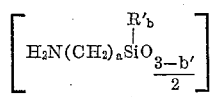

wherein $R'$ represents a member selected from the group consisting of alkyl radicals, aryl radicals and aralkyl radicals; $X$ represents a lower alkoxy radical; $a$ is an integer having a value of at least 3 whereby the $(CH_2)_a$ group is a lower alkylene group; $b'$ is an integer having a value of .0 to 2; and $b$ is an integer having a value of from 0 to 3, and an amine compound, with a cyanuric halide in the presence of a liquid solvent and an acid acceptor within the range of from about 0° C. to the reflux temperature of the reaction mass.

17. Process for the production of silicon-containing triazine compounds represented by the formula:

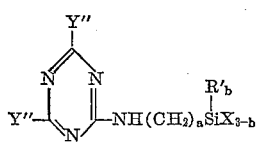

wherein $R'$ represents a member selected from the group consisting of alkyl radicals, aryl radicals and aralkyl radicals; $X$ represents a member selected from the group consisting of lower alkoxy radicals; $a$ is an integer having a value of at least 3, wherein the $(CH_2)_a$ group is a lower alkylene group; $b$ is an integer having a value of from 0 to 3; and $Y''$ represents a member selected from the group consisting of halogen atoms, the amino radical, hydroxyl radicals, arylamino radicals, alkylamino radicals and

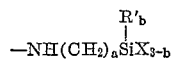

radicals, which comprises admixing an aminoalkyl silane represented by the formula:

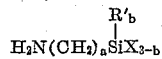

wherein $R'$, $X$, $a$ and $b$ have the same meanings as hereinbefore indicated, and a member selected from the group consisting of aryl amines, alkyl amines, ammonia and water with a cyanuric halide within the range of from about 0° C. to the reflux temperature of the reaction mass.

18. In the process of claim 3, wherein the resulting hydrolyzable silicon-containing triazine compound is hydrolyzed and condensed to produce the corresponding triazine-containing polysiloxane.

19. Process for the production of silicon-containing triazine compounds selected from the group consisting of siloxane polymers consisting of units represented by the formula:

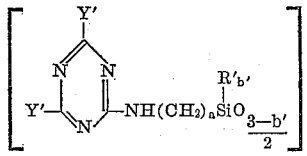

and siloxane copolymers consisting of units represented by the formulae:

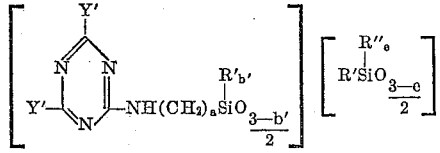

wherein $R'$ represents a member selected from the group consisting of alkyl radicals, aryl radicals and aralkyl radicals; $a$ is an integer having a value of at least 3, wherein the $(CH_2)_a$ group is a lower alkylene group; $e$ and $b'$ are integers having a value of from 0 to 2; and $Y'$ represents a member selected from the group consisting of halogen atoms, the amino radical, hydroxyl radicals, arylamino radicals, alkylamino radicals and

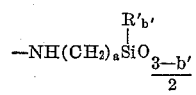

radicals, which comprises admixing an aminoalkylpolysiloxane and a member selected from the group consisting of aryl amines, alkyl amines, ammonia and water, with a cyanuric halide within the range of from about 0° C. to the reflux temperature of the reaction mass.

20. Process for the production of silicon-containing triazine compounds selected from the group consisting of siloxane polymers consisting of units represented by the formula:

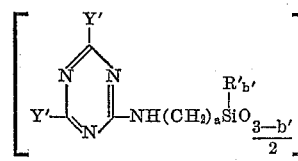

and siloxane copolymers consisting of units represented by the formulae:

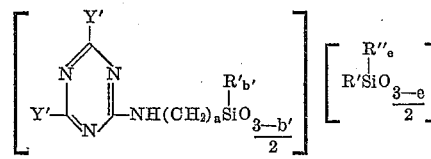

wherein $R'$ represents a member selected from the group consisting of alkyl radicals, aryl radicals and aralkyl radicals; $a$ is an integer having a value of at least 3, wherein the $(CH_2)_a$ is a lower alkylene group; $e$ and $b'$ are integers having a value of from 0 to 2; and Y' represents a halogen atom, which comprises admixing an aminoalkylpolysiloxane with a cyanuric halide within the range of from about 0° C. to the reflux temperature of the reaction mass.

21. The process as claimed in claim 15, wherein the cyanuric halide is cyanuric chloride.

22. The process as claimed in claim 19, wherein the cyanuric halide is cyanuric chloride.

23. The process as claimed in claim 20, wherein the cyanuric halide is cyanuric chloride.

24. The process as claimed in claim 17, wherein the aminoalkyl silane is gamma-aminopropyltriethoxysilane and the cyanuric halide is cyanuric chloride and the resulting silicon-containing triazine compound is 2,4-dichloro-6-(3-triethoxysilylpropylimino)-triazine.

25. The process as claimed in claim 15, wherein the starting reactants are ammonia, the aminoalkyl silane is gamma-aminopropyltriethoxysilane and the cyanuric halide is cyanuric chloride and the resulting silicon containing triazine compound is 2,4-di-amino-6-(3-triethoxysilylpropylimino)-triazine.

26. The process as claimed in claim 15, wherein the aminoalkyl silane is gamma-aminopropyltriethoxysilane and the cyanuric halide is cyanuric chloride and the resulting silicon-containing triazine compound is 2,4,6-tri-(3-triethoxysilylpropylimino)-triazine.

27. The process as claimed in claim 25, wherein 2,4,6-tri-(3-triethoxysilylpropylimino)-triazine is hydrolyzed and condensed to produce a polysiloxane containing units represented by the formula:

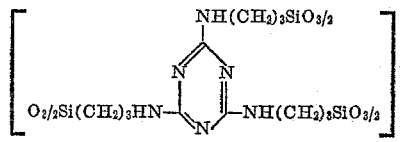

28. The process as claimed in claim 18, wherein about two moles of sulfanilic acid and about one mole of gamma-aminopropylpolysiloxane are added and reacted with cyanuric chloride at a temperature of from about 0° C. to the reflux temperature of the reaction mixture to produce a siloxane containing units represented by the formula:

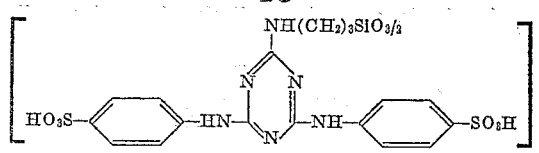

29. The process as claimed in claim 19, wherein the aminoalkylpolysiloxane is a trimethylsiloxy end-blocked aminosilicone oil having the formula:

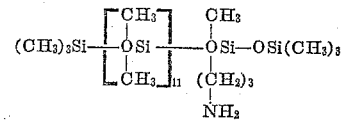

and the cyanuric halide is cyanuric chloride, and the resulting silicon-containing triazine compound is a dichlorotriazine siloxane oil represented by the formula:

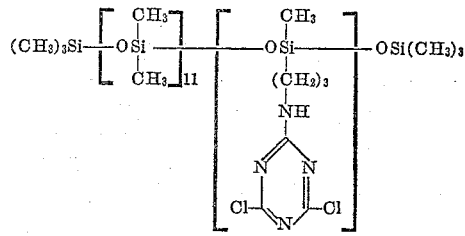

30. The process as claimed in claim 18, wherein the starting reactants are ammonia, the aminoalklypolysiloxane, a trimethylsiloxy end-blocked aminosilicone oil and as the cyanuric halide cyanuric chloride, and the resulting silicon-containing triazine compound is a diaminotriazine siloxane oil represented by the formula:

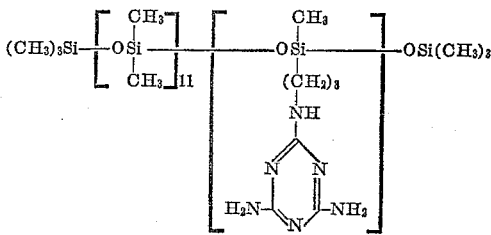

No references cited.

UNITED STATES PATENT OFFICE
Certificate of Correction

Patent No. 2,949,434            August 16, 1960

Donald L. Bailey et al.

It is hereby certified that error appears in the printed specification of the above numbered patent requiring correction and that the said Letters Patent should read as shown below instead of as in the patent—

Column 9, lines 70 to 75, the formula should appear as shown below instead of as in the patent—

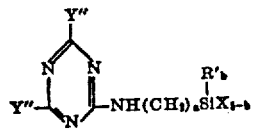

column 11, lines 47 to 57, the formula should appear as shown below instead of as in the patent—

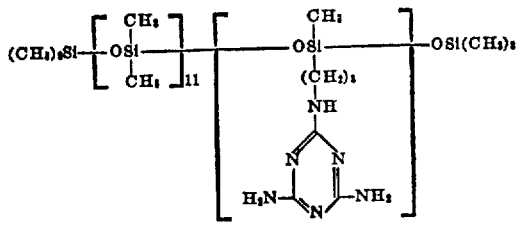

column 12, lines 44 to 49, the formula should appear as shown below instead of as in the patent—

same column 12, lines 53 to 58, the left-hand portion of the formula should appear as shown below instead of as in the patent—

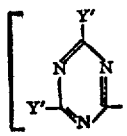

column 13, lines 12 to 14, the formula should appear as shown below instead of as in the patent—

same column 13, lines 36 to 38, the formula should appear as shown below instead of as in the patent—

same column 13, lines 41 and 42, for that portion of the formula reading $R'_b$    read    $R'_b{}'$ same column 13, line 50, for ".0 to 2" read —0 to 2—; column 14, line 12, for the claim reference numeral "3" read —17—; column 15, lines 6, 17, and 23, for the claim reference numeral "15", each occurrence, read —17—; same column 15, line 28, for the claim reference numeral "25" read —26—; same column 15, line 39, for the claim reference numeral "18" read —19—; column 16, line 7, for the claim reference numeral "19" read —20—; same column 16, lines 10 to 14, the formula should appear as shown below instead of as in the patent—

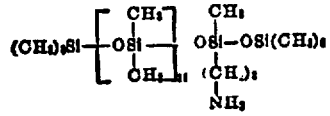

column 16, line 29, for the claim reference numeral "18" read —19—; same column 16, line 31, after "oil" insert—

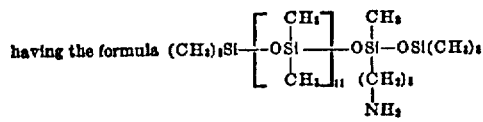

Signed and sealed this 11th day of April 1961.

[SEAL]

Attest:
ERNEST W. SWIDER,
*Attesting Officer.*

ARTHUR W. CROCKER,
*Acting Commissioner of Patents.*